(12) United States Patent
Wattwood et al.

(10) Patent No.: US 7,349,385 B2
(45) Date of Patent: Mar. 25, 2008

(54) INTEGRATED ACCESS PLATFORM

(75) Inventors: James A. Wattwood, Oviedo, FL (US); Michael Shaffer, Lake Mary, FL (US); Haresh Jotwani, Longwood, FL (US); Matt Brocco, Debary, FL (US); Joel Futterman, Deltona, FL (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 922 days.

(21) Appl. No.: 10/159,210

(22) Filed: May 30, 2002

(65) Prior Publication Data

US 2002/0191760 A1 Dec. 19, 2002

Related U.S. Application Data

(60) Provisional application No. 60/294,201, filed on May 30, 2001.

(51) Int. Cl.
*H04L 12/66* (2006.01)
(52) U.S. Cl. .................. 370/354; 370/466; 370/493
(58) Field of Classification Search .............. 370/354, 370/352, 389, 493, 466
See application file for complete search history.

(56) References Cited

U.S. PATENT DOCUMENTS

| 6,466,573 | B1 * | 10/2002 | Renucci | 370/352 |
|---|---|---|---|---|
| 6,584,122 | B1 * | 6/2003 | Matthews et al. | 370/493 |
| 6,704,304 | B1 * | 3/2004 | Gallagher et al. | 370/352 |
| 6,771,763 | B1 * | 8/2004 | Hagirahim et al. | 379/219 |
| 7,006,490 | B2 * | 2/2006 | Hagirahim | 370/352 |
| 2005/0180429 | A1 * | 8/2005 | Ghahremani et al. | 370/395.21 |

OTHER PUBLICATIONS

Cisco Multi-function Access Device Hardware Installation Guide, pp. 1-1 to 1-20 (20 pages).*
Cisco 6700 Series Multiservice Access Platforms—Product Line Brouchure, pp. 1-8.*
Cisco Systems Delivers Multi-Function Access Platform that Reduces Service Provider Network Costs while Expanding Service Offerings, News Release, News@Cisco, Jan. 25, 2000, pp. 1-2, http://newsroom.cisco.com/dlls/fspnisapi567f.html.*

* cited by examiner

*Primary Examiner*—Chi Pham
*Assistant Examiner*—Albert T. Chou
(74) *Attorney, Agent, or Firm*—Laurence A. Greenberg; Werner H. Stemer; Ralph E. Locher

(57) ABSTRACT

An integrated access platform includes a first port configured to receive a first signal from a plain old telephone service (POTS) and a second port configured to receive a second signal from an asymmetric digital subscriber line (ADSL). The integrated access platform also includes a controller system configured to process the first signal and the second signal for access with external networks.

8 Claims, 5 Drawing Sheets

INTEGRATED ACCESS PLATFORM

PRIORITY TO OTHER APPLICATIONS

This application claims the benefit of priority under 35 U.S.C. 119(e) to copending U.S. Patent Provisional Applications, Ser. No. 60/294,201 and filed on May 30, 2001, the contents of said application being incorporated by reference herein in its entirely.

This application is also related to the following U.S. Patent Applications: U.S. patent application Ser. No. 10/159,205 filed May 30, 2002 entitled METHOD FOR OPERATING AND APPARATUS FOR A BACK-PLANE SUPPORTING REDUNDANT CIRCUIT CARDS; U.S. patent application Ser. No. 10/159,207 filed May 30, 2002 entitled METHOD AND APPARATUS OF TESTING A POTS CIRCUIT DSL CIRCUIT THROUGH A SPLITTER; U.S. patent application Ser. No. 10/157,436 filed May 30, 2002 entitled METHOD AND APPARATUS FOR LOADING A MIRROR IMAGE SOFTWARE COPY ACROSS CIRCUIT CARDS; U.S. patent application Ser. No. 10/159,204 filed May 30, 2002 entitled METHOD AND APPARATUS FOR A COMMON MANAGEMENT SOFTWARE SYSTEM; U.S. patent application Ser. No. 10/157,208 filed May 30, 2002 entitled METHOD AND APPARATUS FOR PROVIDING A COMMON TEXT MESSAGING SYSTEM WITHIN A SOFTWARE ARCHITECTURE; U.S. patent application Ser. No. 10/159,209 filed May 30, 2002 entitled METHOD AND APPARATUS FOR PROVIDING A STATE MACHINE OPERATING ON A REAL-TIME OPERATING SYSTEM; and U.S. patent application Ser. No. 10/159,206 filed May 30, 2002 entitled METHOD AND APPARATUS FOR ADMINISTERING MULTIPLE PROVISIONABLE OBJECTS, the contents of each said applications being incorporated by reference herein in their entirety.

BACKGROUND

Communications between a receiver and a transmitter can occur over many types of media. The more bandwidth a particular medium has, the greater the amount of information that can be sent for a fixed amount of time. In the field of telecommunications, the term "narrowband" refers to telecommunications that carry voice information in a narrow band of frequencies. For example, telephone network systems include an infrastructure that includes millions of miles of copper wires and are generally considered to be a narrowband medium. The term "broadband," on the other hand, refers to telecommunications that use a wider band of frequencies to transmit information than narrowband. A wider band of frequencies allows information to be multiplexed and sent on many different frequencies or channels concurrently within the band. Thus, broadband allows more information to be transmitted in a given amount of time.

SUMMARY

The inventions discussed below relate to a platform that integrates narrowband and broadband signals.

The following are some of the advantages of the embodiments described above. The single platform can be used to deliver both narrowband telephony and broadband digital subscriber service (DSL) services. The platform leverages existing copper line infrastructure to allow for eventual migration to full digital broadband access. By using modular peripheral cards, swapping out or adding a single line card in the platform makes adding broadband services easy to do. In addition, a graphical user interface enables a user to add a service line into operation by clicking a computer mouse button. The platform is also accessible via an embedded Web server, which can be remotely accessed at any time. The embedded web server allows the user to monitor the latest network performance information coming from the network.

DETAILED DESCRIPTION

Figure 1:
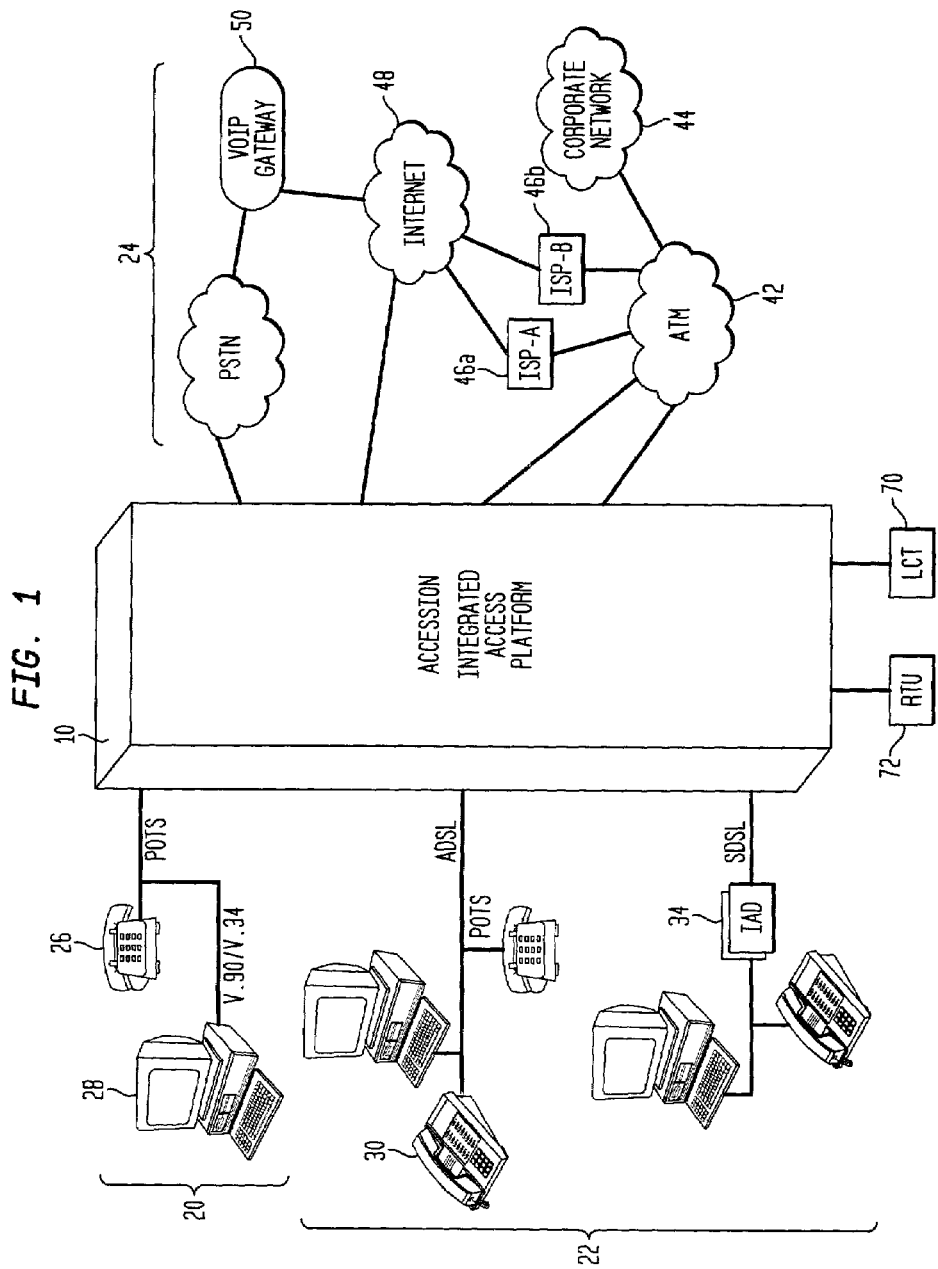
FIG. 1 is a diagram of an integrated access platform in a communications environment.

Referring to FIG. 1, an integrated access platform 10 is used by narrowband telephony services 20 and broadband digital subscriber lines (DSL) services 22 for accessing external networks 24. Narrowband telephony services 20 includes a plain old telephone service (POTS) line that receives signals from a telephone 26 or from a computer modem 28. Broadband DSL services 22 include asymmetric digital subscriber line (ADSL) services such as from an Internet phone such as an ADSL phone 30. Broadband DSL services also include symmetric digital subscriber line (SDSL) services such as voice over DSL (VoDSL) signals received via an integrated access device (IAD) 34.

External networks 24 include an asynchronous transfer mode (ATM) network 42 connected to other networks, for example, a corporate network 44 for access by corporate employees. ATM network 24 is also connected to Internet service providers (ISP) 46 (e.g., ISP-A 46a and ISP-B 46b), which, in turn, are connected to the Internet 48. Internet 48 allows access to other networks including a voice over IP (VoIP) gateway 50. External networks 24 also include a public switched telephone network (PSTN) 52. VoIP gateway 50 can also be accessed through PSTN 52.

A local craft terminal (LCT) 70 can be used to monitor and manage platform 10. For example, any personal computer (PC) with Web Browser 500 (FIG. 4) can serve as an LCT. In addition, access can be made remotely through a dial-up or an in-band ATM remote device. Platform 10 can also be accessed through a remote test unit (RTU) 72. RTU 72 is a twisted pair connection that measures the line parameters within platform 10.

Figure 2:
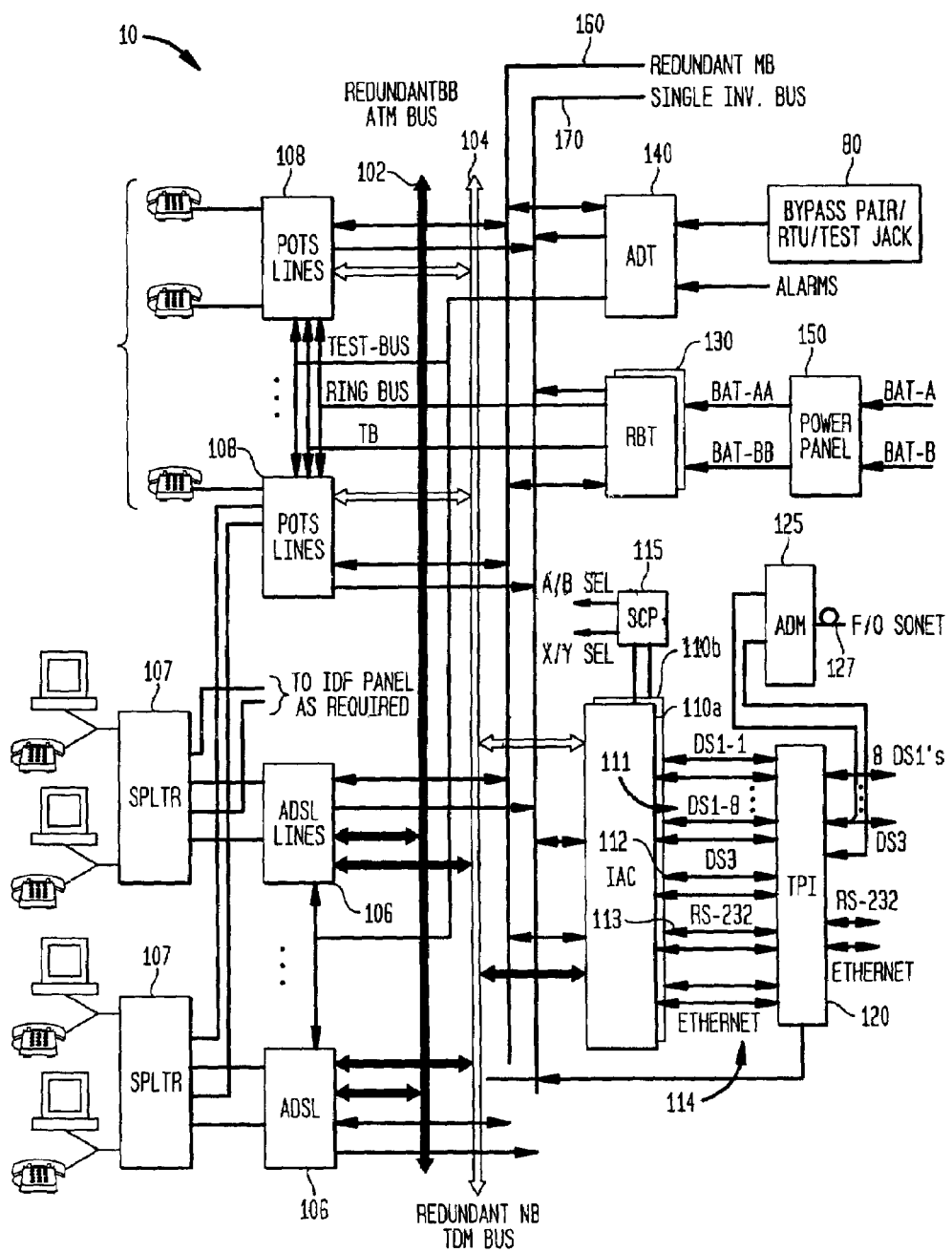
FIG. 2 is a functional diagram of the integrated access platform.

Referring to FIG. 2, as will be explained in greater detail below, platform 10 is in the form of a housing 200 having a rack 202 (FIG. 3) for holding a number of circuit cards, which are interconnected by a series of buses. Platform 10 includes two redundant ATM cell buses 102, two redundant time division multiplex (TDM) buses 104, ADSL peripheral cards 106, POTS peripheral cards 108, two integrated access controller (IAC) cards (110a and 110b), a transport physical interface (TPI) card 120, two ringing and battery (RBT) cards 130a and 130b, an alarm display and test (ADT) card 140, a power panel 150, two maintenance buses 160 and an inventory bus 170.

Two ATM buses 102 receive broadband signals from ADSL cards 106. ATM buses 102 are high-speed buses that carry the broadband data being communicated on platform 10. ATM buses 102 are capable of concurrently carry cells and packet type data. The bus cycle is structured for an ATM cell i.e., during one ATM bus cycle an ATM cell is transferred to the bus. ATM buses 102 are connected across the backplane to interface all of the peripheral cards on the backplane except for power panel 150. Each of ATM buses 102 consist of thirty-two data leads, two clock leads, one frame signal lead, one acknowledge signal lead and one congestion indicator signal lead. Thus, each ATM bus has a total of thirty-seven signal leads. The clock rate used is 33 MHz. The two clocks are Read and Write clocks. Point-to point clock distribution with equal lengths on the backplane as well as a card are used to reduce clock skews. One set of Read and Write clocks are provided for up to two loads (cards) for all cases except where three loads are provided on one Read and Write clock. To enable access for all card positions to ATM buses 102, the shelf has eight Read and eight Write clocks on the backplane. ATM buses 102 have a framed format of sixteen clock cycles long and thirty-two bits wide. The first cycle of each frame is the request cycle (cycle 0). A central bus arbiter accepts the access request and issues a bus access grant during the final cycle of the frame (cycle 15). Each grant issued by the arbiter is for one device on the bus to send one cell to the bus. The cell is transmitted during the fourteen cell body clock cycles (cycles 1-14) of the next bus frame. To detect ATM bus errors, a Bit Interleaved Parity-8 (BIP-8) is calculated over the 54 byte data field.

For backplane implementation, ATM bused 102 traces are designed with controlled impedance. Switching is done on incident edge of a voltage change, with minimum impact from the bus reflections caused by mismatched terminations. The bus characteristic impedance is 50 ohms. Each device on the bus has a Gunning Transceiver Logic Plus (GTLP) buffer that drives the double terminated bus. Each bus line is pulled up to +1.5 volts at each end by non-inductive resistors equal to the bus impedance. Pin staggering and a few external components incorporate hot insertion capability. An ATM bus suitable for this embodiment is a CELL-BUS® device manufactured by TRANSWITCH®, Shelton, Conn.

Two TDM buses 104 are high-speed buses that connects POTS peripheral cards 108 and ADSL peripheral cards 106 to IAC 110. TDM buses 104 carry the narrowband traffic and channel associated signaling (CAS) to and from the POTS peripheral cards 108. TDM buses 104 extend substantially across the entire length of the backplane except for Power panel 150. A pair of TDM buses 104 are provided for redundancy so that one of TDM buses 104 terminates on one IAC card and the other bus of TDM buses 104 terminates on the other IAC card. Each TDM Bus includes eight, 8 MHz Read clock signals, eight, 8 MHz Write clock signals, one 8 KHz Pulse Code Modulation (PCM) synch signal and thirty-two payload signals. The point-to-point read and write clocks are for future use of the TDM bus as an ATM bus. Each of the payload signals operate at 8 Mb/s and carry 128 Time Slots. Each Time Slot contains 8 bits at 64 Kb/s. In this embodiment, twenty-four payload signals are used for the POTS peripheral cards 108 with the other eight available for use as spares. The twenty-four signals that are used for the POTS peripheral cards 108 cards include twelve Tx signals and twelve Rx signals. In other embodiments, TDM buses 104 can also receive channelized VoDSL (CVoDSL).

POTS card 108 is connected to subscribers via a tip/ring (T/R) copper lines. A splitter 107 separates POTS signals from the ADSL signals. Splitter 107 consists of a low-pass filter for the POTS and a high pass filter for the data. In other embodiments, both POTS and ADSL lines may be accessed using a single peripheral card. IAC card 110a provides common control functions and switching for the narrowband functions and broadband functions within platform 10. IAC card 110a receives, via ATM bused 102 and TDM bused 104, signals from POTS cards 108 and ADSL cards 106. IAC card 110a possesses the POTS signals and provides DS1, and GR303 interfacing with TPI card 120. For the ADSL the IAC card 110a processes the signals, including video over DSL, and provides DS1 Inverse Multiplexing over ATM (IMA) or DS3 signaling with TPI card 120. IAC card 110b provides redundancy to IAC card 110a on a hot/standby basis so that when one IAC card is "on" or "hot," the other IAC is on "standby." Each IAC card 110a and 110b has a microprocessor (not shown) for processing the signals. Each IAC card 110a and 110b is also connected to a system control panel (SCP) 115. SCP 115 includes status LEDs and manual switches for the A/B SELECT functions. An intelligent communication link and redundancy arbitration logic is provided between IAC card 110a and IC card 110b.

Outside of platform 10, IAC cards 110 provide eight T1 trunks (not shown). The T1 trunks can be configured for either all narrow-band service or for all broadband service or some for narrowband service and some for broadband service in increments of two. The broadband service carries ATM information in IMA or independent UNI format. T1 interfaces are provided via a faceplate connection to TPI card 120, which connects eight external T1 lines to both IAC card 110a and IAC card 110b via the backplane. TPI card 120 enables the T1's only to the On-line IAC. Relays are used to switch the T1 signals along with the A/B select signal that determines the On-line IAC. Broadband transport is also provided through this connection on a TPI faceplate. DS3 connections from both IAC cards 110a, 110b interface to TPI card 120 via the backplane. The online IAC is connected to the outside DS3 via the relays and A/B select signal on TPI card 120.

Communication with other integrated access platforms in a larger co-located network is achieved using a 10BT Ethernet interface from the online IAC and is selected by TPI card 120. In this case, it is assumed that an Ethernet hub is required. Remote administration to all co-located platforms is achieved by using an RS-232 interface from the online IAC of one of the platforms, via its TPI card. The RS-232 port can also be used for factory or lab diagnostic support and download. Remote administration via the RS-232 port requires an external modem.

All power is provided to IAC cards 110 over redundant raw battery buses.

Each IAC card 110a and 110b has a central processor (not shown), each of which has serial communication controllers (SCC's) to provide for High Level Data Link Control (HDLC), the Ethernet, and ATM segmentation and reassembly (SAR) functions. An RS-232 interface is implemented using SCC on the central processor. The central processor operates at a nominal frequency of 80 MHz, which is multiplied up from a lower frequency using an internal phase-lock loop. A real-time clock function is provided using a separate crystal circuit.

Processor memory consists of 32 Mbytes of FLASH memory and 32 Mbytes of dynamic random access memory (DRAM). The DRAM is expandable to 128 Mbytes. Both FLASH and DRAM cover the entire 32-bit wide bus. FLASH memory is organized as four 8 Mbytes (4M×16) memory devices, which contain boot code, operational code, and database information. DRAM is organized as two sector-based 8 Mbyte (4×2M×16) memory devices, which must contain executable code downloaded from FLASH memory, FLASH download storage as well an operational data storage. All DRAM control and refresh functions are handled by the central processor.

Each IAC card 110a and 110b has narrowband functionality. All TDM traffic is switched through IAC cards 110a and 110b between the subscriber service cards and eight T1 lines using a single TimeSlot Interchange (TSI) device. The TSI is capable of switching any of 4096 timeslots on thirty-two 8.192 Mbps incoming ports onto any of 4096 timeslots on thirty-two 8.192 Mbps outgoing ports. A clock-doubling phase-locked loop (PLL) circuit external to the TSI is required to provide a stable 16.384 MHz signal from 8.192 MHz generated by a quad frame and line interface component (Quad-FALC).

Interfacing to the TSI device are four highways which connect to two Quad-FALC devices, each providing four T1 ports. Each Quad a separate highway to carry channel associated signaling (CAS) in SF or ESF formats. The SF CAS is for TR-08 applications. All CAS processing and interpretation is handled by the POTS-32 line card. Another highway interfaces directly to the central processor for carrying timeslot-orient HDLC to service cards within the shelf. Static pattern data originating in PLD hardware is also inserted onto spare timeslots of this highway. For TR-08 applications, CAS buffering within PLD hardware is required to provide for simultaneous old frame/new frame AB transport to the POTS-32 service cards. One TSI highway is connected to each POTS peripheral card 108 and it carries PCM, CAS and loopback information.

IAC cards 110a and 110b also have broadband functionality. ATM traffic is switched internally on IAC card 110 using a standard Utopia II bus. An ATM master device interfaces directly to one of two ATM cell buses 102in the backplane. Translation memory and cell buffering is accomplished via high-speed synchronous static random access memory (SRAM), which interfaces directly to the ATM master device on a dedicated 64-bit wide bus. This synchronous SRAM is organized as a pair of 128K×16 memory devices. The required amount of synchronous SRAM memory is 1 Mbyte. Processor supervision of the ATM master device occurs through a (8K×8) dual port RAM (DPR) on IAC cards 110a and 110b. A separate serial EEPROM is required to load the ATM master device's own boot code. An ATM master device suitable for this embodiment is the ASPEN® processor manufactured by TRAN-SWITCH®, Shelton, Conn.

Physical (PHY) devices on the internal Utopia II bus include the SAR on the central processor, an inverse multiplexer for ATM (IMA) device, which interfaces with one Quad-FALC, and a DS3 UNI device.

IAC card 110 also has maintenance functions including general maintenance, reset, and alarm information, which is exchanged between redundant IAC cards 110a and 110b and all other cards within platform 10 via redundant maintenance bus. Within PLD hardware on each IAC card 110a and 110b is a scan circuit to provide for automatic transfer of data into and out of memory-mapped registers at a rate not to exceed 8 Mbps. Whether online or offline, both IAC cards 110a and 110b scan all the cards over their own half of the maintenance bus, although each service card only reacts to control information from the online IAC.

IAC cards 110a and 110b also perform an inventory analysis. Like all other cards within platform 10, each IAC card 110a and 110b has its own serial EEPROM to hold inventory information. The online IAC accesses inventory on each card within each IAC card 110a and 110b, including the offline IAC over a single backplane inventory bus.

To operate, each IAC card 110a and 110b requires four voltages including +5V, +3.3V, +2.5V, and +1.5V. On-board DC/DC converters generate +5V and 3.3V supply voltages, used by various devices on the IAC. +2.5V, which is only used needed internally by the ATM master device, is generated using a linear regulator. A linear regulator also generates +1.5V, provided by the online IAC and required as a bias for GTLP signals on both broadband and narrowband buses.

TPI card 120 provides a port for the network interfaces for the DS1, DS3, RS-232 and Ethernet connections. For example, TPI card 120 connects via the DS1 or DS3 interfaces to an add/drop multiplexer (ADM) 125 for connection to a Synchronous Optical Network (SONET) 127. TPI card 120 connects an A/B (hot/standby) select signal, via switchover relays, to either IAC card 110a or IAC card 110b. The switchover relays include the DS1 switchover relays, DS3 switchover relays, the RS-232 switchover relays and the Ethernet switchover relays. TPI card 120 also provides protection switching for IAC card 110a and IAC card 110b.

Specifically, TPI card 120 provides the following functionality for each interface. The DS1 Interface provides relays for DS1 signal selection from DS1 signal from IAC card 110a or IAC card 110b, relays for 8 DS1 signals each with two Tx and two Rx signals per DS1, DS1 signals from IAC card 110a and IAC card 110b to TPI card 120 via the backplane, relay drivers for DS1 relays, an A/B-Online selection logic and a DSX1 cable at the front of TPI card 120.

The DS3 Interface provides, RF Relays for DS3 signal selection, a DS3 signal from IAC card 110a or IAC card 110b via the backplane, RF relays for Tx coax and Rx coax, relay drivers for DS3 RF relays, an A/B-Online selection logic, and Tx and Rx DS3 coaxial connectors and cable at the front of TPI card 120.

The Ethernet Interface provides relays for Ethernet signal selection, an Ethernet signal routed on the backplane from the IAC card 110a and IAC card 110b to TPI card 120, relay drivers for the relays, an A/B-Online selection logic, and an RJ45 connector and cable at the front of TPI card 120.

The RS-232 Interface provides relays for RS-232 signal selection, an RS-232 signal routed on the backplane from the IAC card 110a and IAC card 110b to the TPI card 120, relay drivers for RS-232 relays, an A/B-Online selection logic and an RS-232 cable at the front of TPI card 120.

RBT cards 130a and 130b provide ringing at 20 Hz and a talk battery to the entire platform 10 for POTS line support.

During normal operation, ringing for the POTS lines in platform 10 is supplied from 2 independent ring generators that are located on each of RBT cards 130a and 130b. During normal operation with both generators working, the on-line ring generator supplies the full load for platform 10 with ringing power. In case of failure of either unit, the other RBT card takes over supplying the entire platform with ring power The switching of the ring generator is achieved by using relay contacts on each RBT card. Thus, RBT card 130b provides redundancy to RBT card 130a in a worker/standby mode similar to IAC card 110a and IAC card 110b. RBT 130a is on the X circuit and RBT 130b is on the Y circuit. SCP 115 provides manual switch for the X/Y SELECT functions.

ADT card 140 provides alarm collecting and reporting functions. System level alarm light emitting diodes (LEDs) and individual subsystem LEDs indicate when alarms on the system or individual subsystem level have been triggered. ADT card 140 also has a test response circuit (TRC) (not shown) for testing line circuits in the subscriber line interface circuit (SLIC) interfaces. ADT card 140 supplies a 1 KHz test signal for verifying the wiring between a POTS line circuit, an ADSL circuit and an associated POTS splitter 107 by using a test-tone generator (not shown).

ADT card 140 provides alarms to report system failures and other conditions that affect the proper operation of platform 10. The alarms from ADT card 120 and from there, by polling via redundant maintenance bus 160, to IAC cards 110a and 110b. Once an alarm is reported to the ADT card 140, the ADT card lights the appropriate alarm LED until the alarm is cleared. Alarms resulting from the same fault are reported as a single occurrence.

In addition to receiving the platform subsystem level user alarm inputs and outputs, the user alarm inputs are intended to receive fault indications from OEM equipment such as a fiber system, channel bank, RTU, security system, etc. The outputs are controlled by supervisory bits from IAC 110 via maintenance bus 160 and offer isolated type C relay contacts.

Two alarm level categories exist in platform 1: logic level and BAT(−) (−48V). The logic level category is for cards in platform 10 only and these alarms are reported to IAC 110 directly. All alarms generated by supporting subsystems to the IAP shelf are BAT(−)alarms. The convention for reporting an alarm to IAC cards 110a and 110b is to set the alarm bit to a logic 1 (high) in ADT card 140. IAC cards 110a and 110b poll the ADT card 140 at one-second intervals.

Power panel 150 provides power access for a −48 V battery connection into the platform 10. Power Panel 150 holds circuit breakers and alarm LEDs for the breakers. Power panel 150 also includes a field effect transistor (FET) that is used to control a set of shelf fans within platform 10 "on" and "off" to cool the cards as required.

Two redundant serial maintenance buses 160 connect to all the cards on the shelf except power panel 150 and TPI card 120. The maintenance buses allows IAC card 110a and IAC card 110b to maintain the control functions in the other cards. Non-redundant inventory bus 170 provides for serial access to the entire inventory of erasable programmable read only memory (EPROMs) located on every card in the IAP shelf. The EPROM on each card stores the manufacturing information for that card. This allows the user to easily know what model number and which revision each card is without removing the card.

Figure 3:
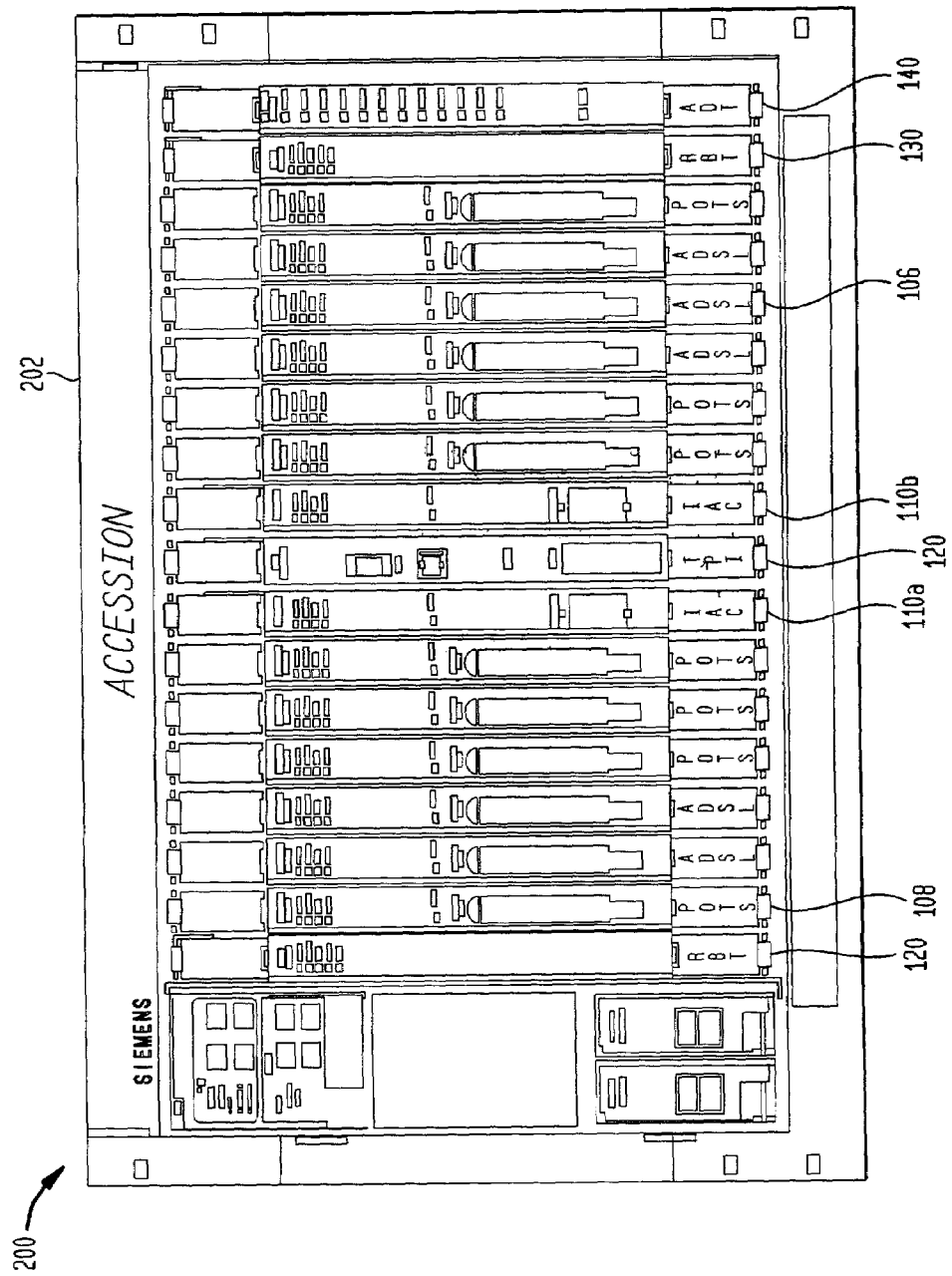
FIG. 3 is a diagram of the platform rack.

Referring to FIG. 3, the cards described above are placed within a rack 200 for ease of access for maintenance and connectivity and ease in upgrading platform 10. For example, as broadband becomes more prevalent in telecommunications compared to narrowband, POTS cards 108 can be replaced with ADSL cards 106 easily so that the entire rack may be populated with ADSL cards 106.

Figure 4:
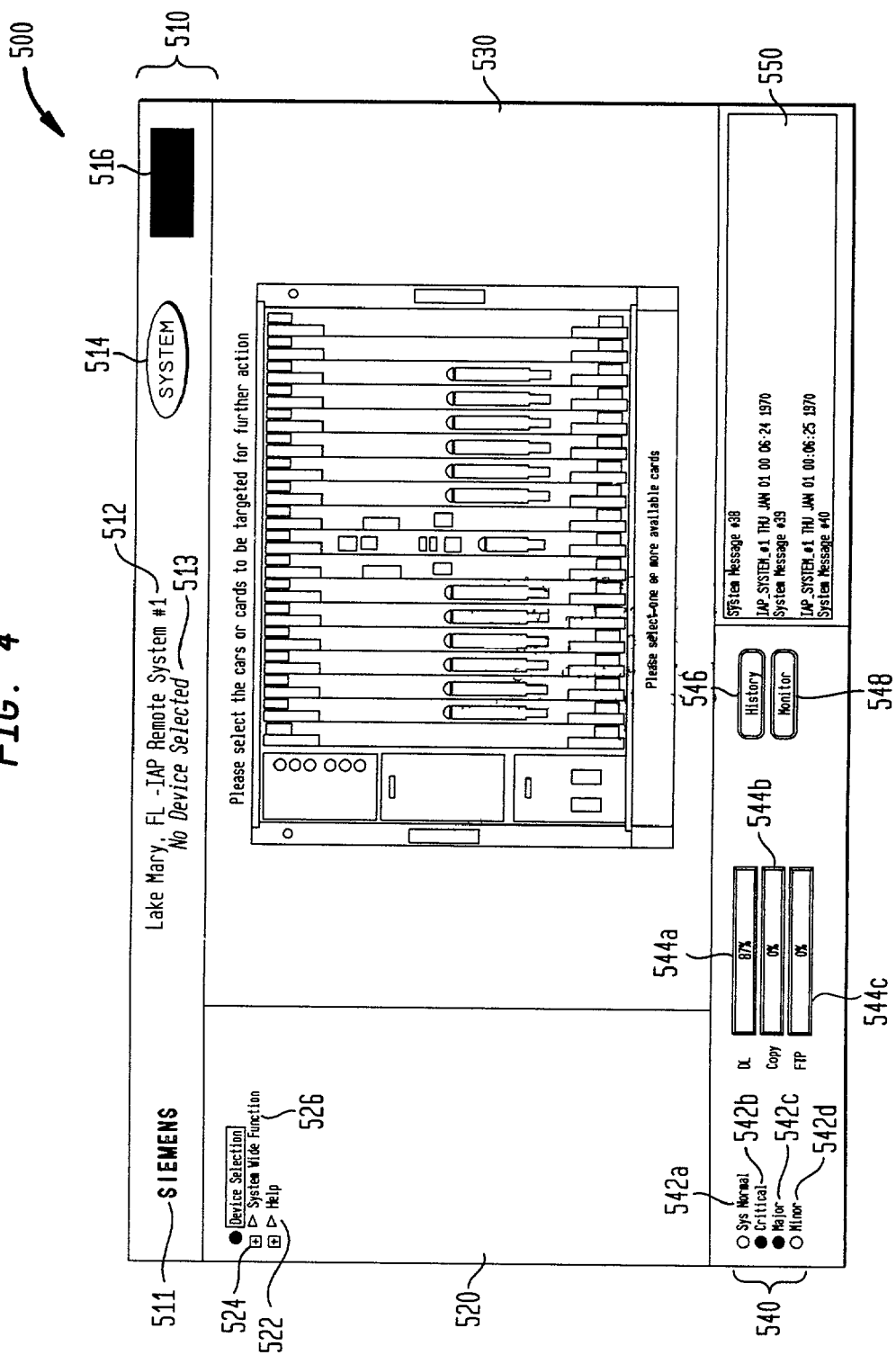
FIG. 4 is a depiction of a web page for the graphical user interface used to manage the integrated access platform.

Referring to FIG. 4, a graphical user interface (GUI) includes a standard web page 500 having a banner region 510, a tree region 520, a content region 530 and a status region 540. Web page 500 allows a user to navigate through screens to monitor and manage platform 10.

Banner region 510 is the same for all subsequent web pages that use the standard Web page 500. Banner region 510 includes company logo image 511, a system site name text 512, a device currently selected text 513, a system icon navigation link 514 and a HELP icon navigation link 516. System icon link 514 is a link to a system wide function selection page 600 (FIG. 5A) and is a shortcut into a navigation tree 522, which is described below. A click with the left mouse button on system icon 514 causes a system functions tree item 605 (FIG. 5A) to become highlighted (selected) in tree region 520. This action also causes the view of content region 530 to change by displaying system wide function selection page 600.

HELP icon 516 is a context-sensitive help button. A click with the left mouse button on HELP icon 516 causes the HELP page associated with the current view of content region 530 to be displayed. The HELP information is rendered in a separate Browser window of fixed size, which does not contain a menu bar, status bar, or tool bar. When HELP icon 516 is clicked for a view of content region 530 that does not have an associated HELP page, a pop-up box is displayed stating that HELP is not available for this subject.

Tree region 520 provides navigation tree 522 to assist the user in navigating throughout the web interface. In navigation tree 522 any subordinate level in navigation tree 522 can be expanded or collapsed by simply clicking the left mouse button on a "plus or minus" icon 524 for that subordinate node 526. Expanding and collapsing elements in navigation tree 522 does not change the view of any other regions. This enables the user to view all valid options before making a selection. Each node of navigation tree 522 is an actual link to another Web page. Clicking the left mouse button on tree node 526 causes the current view of contents region 530 to change, which enables the user to navigate throughout the Web interface.

The view for tree region 520 depends on the device(s) selected and the access rights of the user. If a tree node function is not permitted due to the access rights of the user or is invalid for the device(s) selected, the tree-node function is not displayed in the navigation tree. All views for tree region 520 contain the ATM, PCM, System, and HELP Functions subordinate-level trees. The top node of every tree is a link back to the Main page (i.e., Device Selection page).

Content region 530 is the most dynamic of the four regions. This region is used to display the many views of a Web page. Each navigation tree node in tree region 520 directly corresponds to a view in content region 530. Terminating tree nodes in navigation tree 522 correspond to a content region view that contains a form, a report, or a completion message, but nonterminating tree nodes correspond to a view with navigation links. The content region views for nonterminating tree nodes provide another way for the user to navigate through the Web interface. These views serve as a mini-HELP index that describe all the valid options under the currently selected subordinate tree level. Clicking the left mouse button on a navigation link in a nonterminating content region view causes the following events to occur: selected subordinate tree in tree region 520 is expanded if currently collapsed, corresponding tree-node in the subordinate tree in the tree region 520 is then selected, and corresponding content region view for the subordinate tree item is then displayed in content region 530.

Figure 5A:
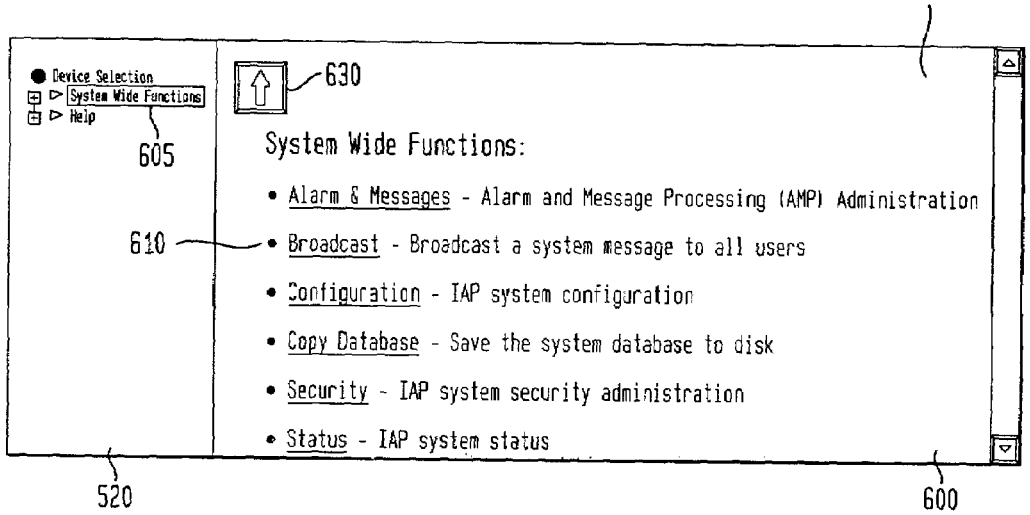
FIG. 5A is a depiction of a system-wide functions view.
Figure 5B:
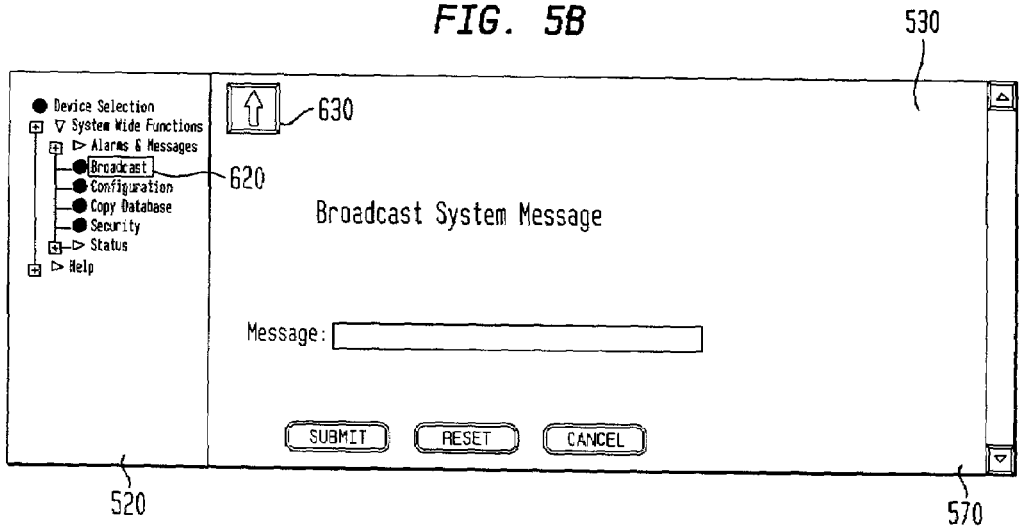
FIG. 5B is a depiction of a broadcast message view.

All views of content region 520 contain an "Up Arrow" icon 630 (FIGS. 5A and 5B). "Up Arrow" icon 630 provides another means of navigation. Clicking the left mouse button on "Up Arrow" icon 630 causes a parent node of the currently selected tree item to become selected. This action causes the view of the content region 530 to change to the corresponding view of the parent node. For example, clicking on "Up Arrow" icon 630 in FIG. 5B changes the content region 530 showing a broadcast message page 570 to the parent view in FIG. 5A of system wide functions page 600. While the navigation links in a nonterminating content region view provide downward tree navigation, "Up Arrow" icon 630 provides upward tree navigation.

Like banner region 110, the view for status region 540 stays consistent for all the pages that use the standard layout of Web page region 500. Status region 540 includes an Alarm and Status panel 542, three work progression bars 544, a history button 546, a monitor button 548 and an Alarm and Message Processing (AMP) Applet window 550.

The Alarm and Status panel 542 is an active image that displays the alarm state of the system. This active image is updated periodically and contains the following four indicators: a System Normal indicator 542a, a critical alarm indicator 542b, a major alarm indicator 542c and a minor alarm indicator 542d.

The color for these indicators reflects the presence of an alarm or a degraded system. System normal indicator 542a is displayed in green when all other LEDs on ADT card 140 are inactive. Critical indicator 542b and major alarm indicator 542c are displayed in red when an alarm occurs, and minor alarm indicator 542c is displayed in yellow when an alarm occurs. All indicators are displayed in gray in the inactive state. The Alarm and Status panel 542 also serves as a navigation link into a High-Level System Status view of content region 530.

Each of the three work progression bars 544 are dedicated to a specific task. A top progress bar 544a is used for a Device Download (DL:). A middle progress bar 544b is used for a database copy (Copy:). A bottom progress bar is used for a file transfer (FTP:).

Work progression bars 544 indicated the percentage of an active task that has been completed. All three task types can be active at the same time. However, the system does not allow multiple occurrences of the same type to occur simultaneously (i.e., the system blocks the occurrence of multiple device downloads, database copies, or file transfers at the same time). Platform 10 logs all AMP messages in a circular log file within the system.

The user can display the last 25 AMP messages that were logged by clicking the left mouse button on history button 546. These 25 AMP messages are displayed in a separate Browser outside of the standard Web page region layout 500.

Like history button 546, monitor button 548 generates a new Browser window when clicked with the left mouse button. The page for this new Browser window does not conform to the standard layout of Web page region 500. The contents of this new page (not shown) provide a larger version of the Status region that contains the following: a system site name, LEDs from ADT card 140, LEDs from the SCP 115, three work progression bars, a History button, platform Main Page button and an AMP Applet window (25-line display instead of seven lines).

AMP Applet window 550 serves as a small cathode ray tube (CRT) that displays the current AMP messages for platform 10. Like on a CRT, the messages scroll off the top of the AMP Applet window. Missed messages can be displayed using the History button or by retrieving the log file from a System Function Selection page.

The following are the common properties and rules that apply to the web interface when form requests are processed. All forms are displayed in content region 530. A submit function executes the function related to the form. Results (Completion or Error messages) of a form submission are displayed in content region 530. A cancel function takes the user back to the function level node for the previously selected tree item. Content region 530 is also changed to display the corresponding view for the function level node.

A reset function restores the data input fields of a form back to their original state. An OK button on a form Results page returns the user to the original view of content region 530 for the selected tree node (i.e., first page of the form). All service-affecting requests result in a Warning message. A submit function for a service-affecting request causes a Confirmation Pop-Up Box to be issued. This Confirmation Pop-Up Box, which contains an OK button and a Cancel button, states that the request is service-affecting. The OK button in a service-affecting Confirmation Pop-Up Box executes the function for the related form. The Cancel button in a service-affecting Confirmation Pop-Up Box has the same effect as the Cancel function on the form.

Still other embodiments are written within the scope of the claims.

What is claimed is:

1. An integrated access platform comprising:
a first port configured to receive a first signal from a plain old telephone service (POTS);
a second port configured to receive a second signal from an asymmetric digital subscriber line (ADSL); and
a controller system coupled to both a narrowband bus for transmitting information from the first port and a broadband bus for transmitting information from the second port, the controller system configured to process the first signal and the second signal for accessing external networks said platform further comprising a ring and battery (RBT) system connected to the first port through a talk battery connection and a ring bus, RBT system including redundant cards.

2. The platform of claim 1, further comprising:
an alarm display and test (ADT) system connecting to the second port and the first port.

3. The method of claim 2, further comprising:
redundant maintenance buses configured to connect to the controller system, the RBT system, the ADT system, the first port and the second port.

4. The method of claim 3, further comprising:
an inventory bus configured to connect to the controller system, the RBT system, the ADT system, the first port and the second port.

5. An integrated access platform comprising:
a first port configured to receive a first signal from a plain old telephone service (POTS);
a second port configured to receive a second signal from an asymmetric digital subscriber line (ADSL);
a controller system configured to receive the first signal over a narrowband bus, to receive the second signal over a broadband bus and to process the first signal and the second signal for accessing external networks; and
a ring and battery (RBT) system connected to the first port through a talk battery connection and a ring bus, RBT system including redundant cards.

6. The platform of claim 5, further comprising:
an alarm display and test (ADT) system connecting to the second port and the first port.

7. The method of claim 6, further comprising:
redundant maintenance buses configured to connect to the controller system, the RBT system, the ADT system, the first port and the second port.

8. The method of claim 7, further comprising:
an inventory bus configured to connect to the controller system, the RBT system, the ADT system, the first port and the second port.

* * * * *